United States Patent
Roussell et al.

(10) Patent No.: US 7,760,343 B2
(45) Date of Patent: Jul. 20, 2010

(54) METHOD AND APPARATUS FOR DETERMINING FREQUENCY-DEPENDENT $V_\pi$ OF A MACH-ZEHNDER OPTICAL MODULATOR

(75) Inventors: Harold V. Roussell, Burlington, MA (US); Edward I. Ackerman, Cambridge, MA (US)

(73) Assignee: Photonic Systems, Inc., Billerica, MA (US)

( * ) Notice: Subject to any disclaimer, the term of this patent is extended or adjusted under 35 U.S.C. 154(b) by 491 days.

(21) Appl. No.: 11/696,397

(22) Filed: Apr. 4, 2007

(65) Prior Publication Data

US 2007/0237441 A1   Oct. 11, 2007

Related U.S. Application Data

(60) Provisional application No. 60/744,341, filed on Apr. 5, 2006.

(51) Int. Cl.
*G01N 21/00* (2006.01)

(52) U.S. Cl. .................................. 356/73.1
(58) Field of Classification Search .............. None
See application file for complete search history.

(56) References Cited

U.S. PATENT DOCUMENTS

2006/0263098 A1* 11/2006 Akiyama et al. ............ 398/188

* cited by examiner

*Primary Examiner*—Tu T Nguyen
(74) *Attorney, Agent, or Firm*—Kurt Rauschenbach; Rauschenbach Patent Law Group, LLP

(57) ABSTRACT

An apparatus for determining $V\pi$ of an optical modulator includes an RF source that generates a variable power RF modulation signal for modulating an optical modulator. An optical detector detects a modulated optical signal generated by the optical modulator and generates an electrical detection signal in response to the detected modulated optical signal. An RF power meter measures an RF detection signal power to determine a minimum RF detection signal power, an RF modulation signal power corresponding to the minimum RF detection signal power being used to calculate $V\pi$ of the optical modulator.

19 Claims, 5 Drawing Sheets

| Frequency (GHz) | Measured $IP3_{in}$ (dBm) | $V_\pi$ calculated from Equation (1) (Volts) | Measured $P_{null,in}$ (dBm) | $V_\pi$ calculated from Equation (2) (Volts) |
|---|---|---|---|---|
| 2 | 14.36 | 1.834 | 16.87 | 1.808 |
| 6 | 15.19 | 2.019 | 17.85 | 2.025 |

METHOD AND APPARATUS FOR DETERMINING FREQUENCY-DEPENDENT $V_\pi$ OF A MACH-ZEHNDER OPTICAL MODULATOR

RELATED APPLICATION SECTION

This application claims priority to U.S. Provisional Patent Application Ser. No. 60/744,341, filed Apr. 5, 2006, entitled "Improved Method for Determining the Frequency-Dependent Vπ of a Mach-Zehnder Modulator," the entire application of which is incorporated herein by reference.

The section headings used herein are for organizational purposes only and should not to be construed as limiting the subject matter described in the present application.

BACKGROUND SECTION

The performance of a high-speed fiber-optic link depends very strongly on the efficiency with which light is modulated by the input electrical signal. This modulation efficiency is often referred to as the "slope efficiency" of the modulation. See, for example, C. Cox, Analog Optical Links: Theory and Practice, Cambridge University Press, 2004. In links that use a Mach-Zehnder interferometric modulator as the modulation device, the slope efficiency depends directly on a parameter known as Vπ. The parameter Vπ is relatively difficult to measure using prior art methods and apparatus.

BRIEF DESCRIPTION OF THE DRAWINGS

The aspects of this invention may be better understood by referring to the following description in conjunction with the accompanying drawings. Identical or similar elements in these figures may be designated by the same reference numerals. Detailed description about these similar elements may not be repeated. The drawings are not necessarily to scale. The skilled artisan will understand that the drawings, described below, are for illustration purposes only. The drawings are not intended to limit the scope of the present teachings in any way.

FIG. 5 presents a table of data showing two measurements of $P_{null,in}$ and two calculations of Vπ based on the two measurements of $P_{null,in}$ for a Mach-Zehnder interferometric modulator.

DETAILED DESCRIPTION

While the present teachings are described in conjunction with various embodiments and examples, it is not intended that the present teachings be limited to such embodiments. On the contrary, the present teachings encompass various alternatives, modifications and equivalents, as will be appreciated by those of skill in the art. For example, it should be understood that there are numerous variations of the apparatus illustrated in FIG. 3 for measuring the parameter $P_{null,in}$ and determining Vπ of a Mach-Zehnder interferometric modulator according to the present invention. Furthermore, it should be understood that there are numerous parameters other than the described parameter $P_{null,in}$ that can be derived to determine Vπ according to the present invention.

It should be understood that the individual steps of the methods of the present invention may be performed in any order and/or simultaneously as long as the invention remains operable. Furthermore, it should be understood that the apparatus and methods of the present invention can include any number or all of the described embodiments as long as the invention remains operable.

The parameter Vπ of a Mach-Zehnder interferometric modulator (MZI) is defined as the voltage that changes the phase in one arm of the interferometer by 180 degrees (π radians) relative to the other arm. Thus, the parameter Vπ of an MZI is the voltage that switches the output light between its maximum and minimum intensities. The parameter Vπ of an MZI is a frequency-dependent parameter, Vπ (f). See, for example, G. Gopalakrishnan, W. Burns, R. McElhanon, C. Bulmer, and A. Greenblatt, "Performance and modeling of broadband LiNbO₃ traveling wave optical intensity modulators," J. Lightwave Technol., vol. 12, pp. 1807-1819, October 1994. One established method for experimentally determining the parameter Vπ (f) of an MZI at a high frequency is to calculate the input third-order intercept power, $IP3_{in}$ (f), from the results of a two-tone third-order intermodulation distortion measurement as described in connection with FIG. 1.

Figure 1:
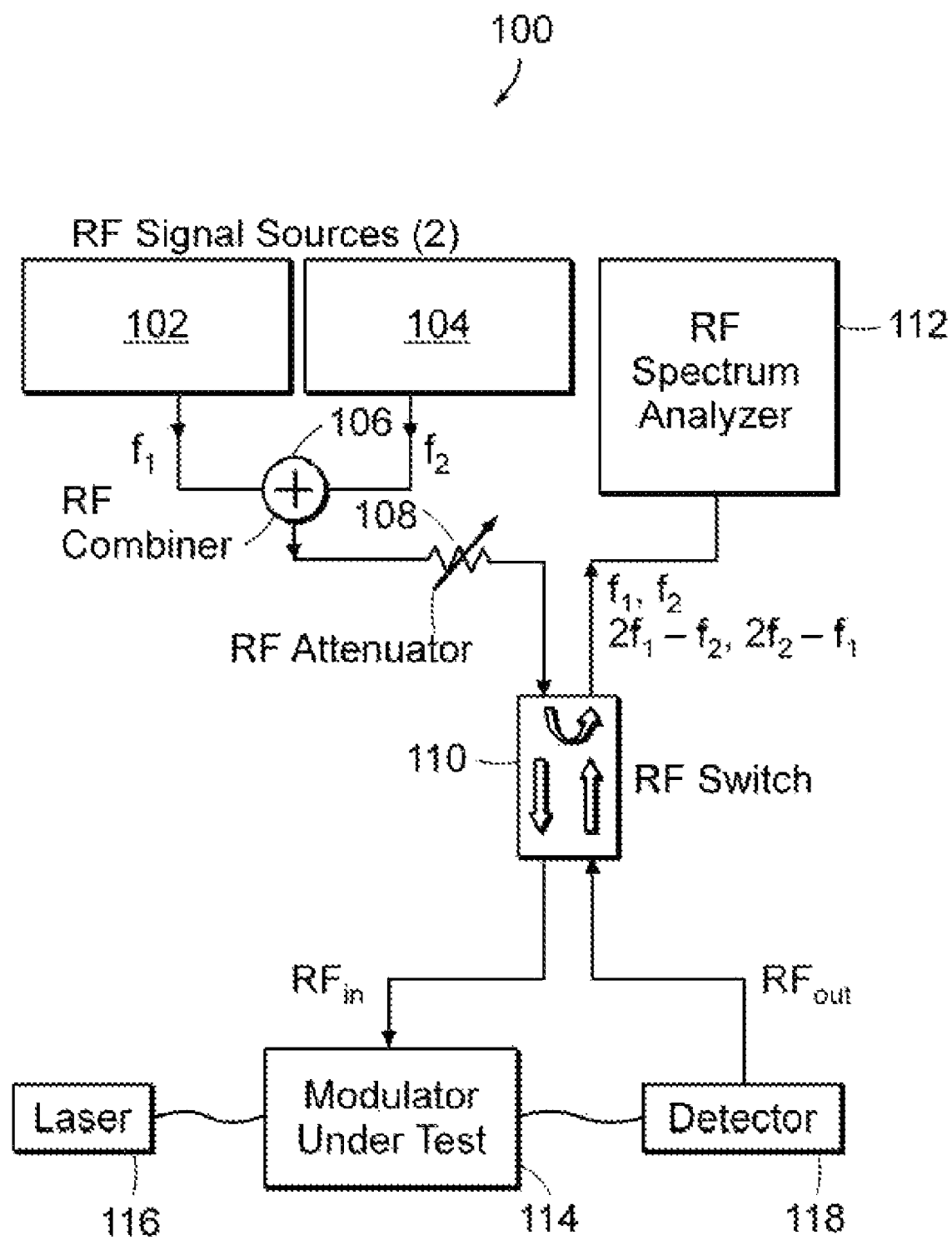
FIG. 1 illustrates a block diagram of a prior art apparatus used to determine the parameter Vπ (f) of a Mach-Zehnder interferometric modulator by calculating the input third-order intercept power from the results of a two-tone third-order intermodulation distortion measurement.

FIG. 1 illustrates a block diagram of a prior art apparatus 100 used to determine the parameter Vπ(f) of a Mach-Zehnder interferometric modulator by calculating the input third-order intercept power from the results of a two-tone third-order intermodulation distortion measurement. The apparatus 100 includes a first 102 and second RF source 104 that generate a first and a second RF signal at a respective output. The outputs of the first and the second RF source 102, 104 are electrically connected to a respective one of a first and a second input of an RF combiner 106. The RF combiner 106 combines the two RF signals at an output. The output of the RF combiner 106 is electrically connected to a variable attenuator 108 that controls the level of the combined RF signal.

An RF switch 110 includes a first input that is electrically connected to the output of the attenuator 108. A first output of the RF switch 110 is electrically connected to an input of an RF spectrum analyzer 112. A second output of the RF switch 110 is electrically connected to the RF modulation input of a modulator under test 114. The output of a laser 116 is optically coupled to an optical input of the modulator under test 114. The optical output of the modulator under test 114 is coupled to an optical input of a detector 118. The electrical output of the detector 118 is coupled the second input of the RF switch 110.

The apparatus 100 has two modes of operation. In one of its two modes of operation, the RF switch 110 passes the combined RF signal that is attenuated by the attenuator 108 to the input of the RF spectrum analyzer 112. In the other of its two modes, the RF switch 110 passes the combined RF signal that is attenuated by the attenuator 108 to the RF modulation input of the modulator under test 114. In addition, in this second mode, the RF switch 110 passes the RF output of the detector 118 to the RF spectrum analyzer 112. Thus, the RF spectrum analyzer 112 either receives the combined RF signal that is attenuated by the attenuator 108 that would otherwise be applied to the modulator under test 114 or it receives the RF output signal generated by the modulator under test 114 when it is fed with the combined RF signal that is attenuated by the attenuator 108.

Figure 2:
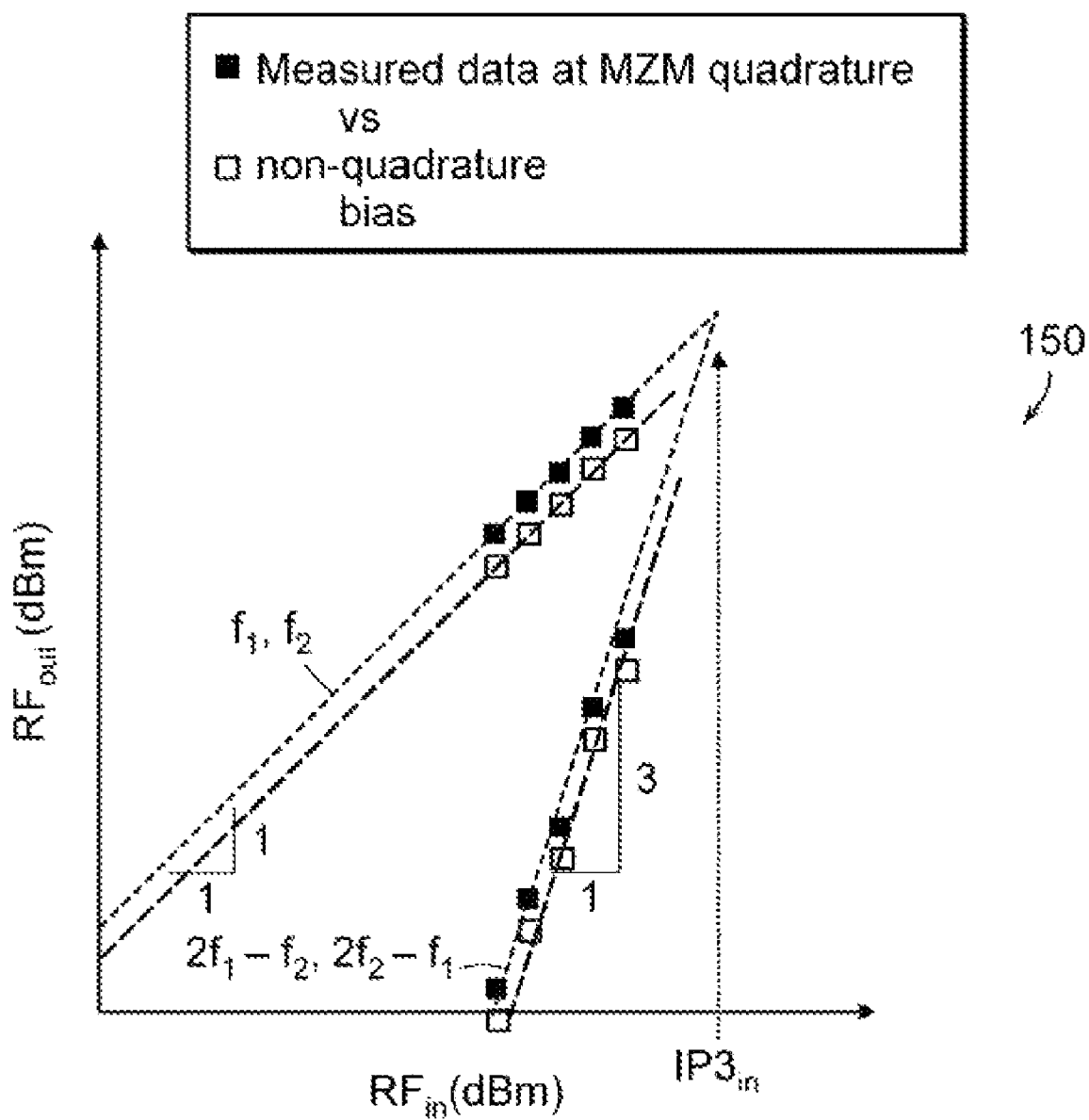
FIG. 2 presents experimental data taken with the prior art apparatus described in connection with FIG. 1.

FIG. 2 presents experimental data 150 taken with the prior art apparatus described in connection with FIG. 1. The experimental data 150 were taken using a JDS Uniphase 1.55-μm DFB laser for the laser 116, an Arasor 1.55-μm lithium niobate Mach-Zehnder interferometric modulator for the modulator under test 114, and a Discovery Semiconductors InGaAs photodetector for the detector 118. In addition, the experimental data 150 were taken under condition where $f_1$ and $f_2$ are very close to the same frequency. The experimental data 150 presents the RF output signal power for the first and second RF signals having frequencies $f_1$ and $f_2$, respectively, and at third-order intermodulation frequencies $2f_1-f_2$ and $2f_2-f_1$, as a function of the RF modulation input power at frequencies $f_1$ and $f_2$.

The experimental data 150 present the RF output signal generated by the modulator under test 114 while being driven by the combined RF signal applied to the RF modulation input. The experimental data 150 were acquired with the modulator under test 114 operating at a quadrature bias condition and also with the modulator under test 114 operating at a non-quadrature bias condition. The resulting data 150 for the modulator under test 114 operating at the quadrature bias condition and operating at a non-quadrature bias condition are extrapolated to straight lines. For both the quadrature bias condition and the non-quadrature bias condition, the input power at which the extrapolated $f_1$ and $f_2$ data intersect with the extrapolated $2f_1-f_2$ and $2f_2-f_1$ data is referred to as the $IP3_{in}$ point.

The parameter Vπ (f) can be determined from the extrapolated data measurement of the $IP3_{in}$ (f) point because the Mach-Zehnder modulator has a well known sinusoidal transfer function. That is, the parameter Vπ is known to be related to the $IP3_{in}$ point by the following equation:

$$IP3_{in}(f) = \frac{4V_\pi^2(f)}{\pi^2 R_0},$$

where $R_0$ is the impedance of the RF source, which is typically 50Ω. The $IP3_{in}$ point, and thus Vπ, is dependent on the driving frequencies $f_1$ and $f_2$. Thus, changing the driving frequencies $f_1$ and $f_2$ will change the Vπ. FIG. 2 indicates that the measured data at quadrature bias and the measured data at non-quadrature bias result in slightly different $IP3_{in}$ extrapolations. Therefore, the determination of Vπ using the prior art methods is somewhat dependent on the modulator's bias condition.

One limitation of this prior art method for determining Vπ (f) is that the extrapolations of the data shown in FIG. 2 to the point where they intercept can only be validly drawn through data points measured for relatively weak input signals. Weak input signals are considered to be signals that have amplitudes $v_m \ll V\pi$, where $v_m$ is the amplitude of the two-tone input signal $v_m \cdot [\cos(2\pi f_1 t)+\cos(2\pi f_2 t)]$. For low-amplitude $v_m$, the third-order intermodulation distortion products are very weak and, thus difficult to measure with the desired precision. This difficulty in measurement directly affects the accuracy of the $IP3_{in}$ extrapolation, and thus the accuracy of the calculated Vπ.

Another disadvantage of this prior art method of determining Vπ is that performing the physical measurements requires relatively expensive test equipment, such as two accurate RF sources 102, 104 and a relatively expensive RF spectrum analyzer 112. The RF spectrum analyzer 112 is required because it is difficult to distinguish the output signal of the modulator under test 114 operating at the intermodulation distortion frequencies $2f_1-f_2$ and $2f_2-f_1$ from the output signal of the modulator under test 114 operating at the fundamental frequencies $f_1$ and $f_2$. These measurements cannot be easily performed with inexpensive RF power meters unless expensive extremely narrowband filters are used because all four of these frequencies are very closely spaced during typical measurements.

Another disadvantage of this prior art method of determining Vπ (f) is that any portion of the output signal from one RF signal source that reaches the other RF signal source will tend to generate third-order intermodulation products unrelated to the Vπ of the modulator. Portions of the output signal from one RF signal source that reach the other RF signal source are commonly caused by leakage in the combiner 106 and from various reflections. Such third-order intermodulation products will reduce the accuracy of the $IP3_{in}$ extrapolation and thus, the accuracy of the calculated Vπ. High quality RF isolators are, therefore, needed to obtain accurate $IP3_{in}$ extrapolations, and thus accurate calculations of Vπ.

Another disadvantage of this prior art method of determining Vπ (f) is that for each input power, two different powers need to be measured. That is, one power measurement is performed at either $f_1$ and $f_2$ and one power measurement is performed at either $2 f_1-f_2$ or $2 f_2-f_1$. Yet another disadvantage of this prior art method of determining Vπ (f) is that operating parameters can change between subsequent data point measurements and these changes in the operating parameters will reduce the accuracy of the $IP3_{in}$ extrapolations and, thus the accuracy of the Vπ calculation. For example, the modulator's bias point or one or more environmental factors, which affects the total optical power reaching the photodetector, can change so as to cause errors in the $IP3_{in}$ extrapolations, and thus cause errors in the Vπ calculation.

The present invention relates to methods and apparatus for characterizing the frequency-dependent Vπ (f) of a Mach-Zehnder interferometric modulator that is less hardware-intensive and less prone to error than the prior art methods. In one embodiment of the present invention, the methods and apparatus of the present invention characterize the frequency-dependent Vπ of a Mach-Zehnder modulator by directly calculating Vπ from a single data point.

The expression for $IP3_{in}$ as a function of Vπ for a particular frequency that was described in connection with FIG. 2 can be derived because of the well-defined sinusoidal nature of a Mach-Zehnder interferometric modulator. The present invention is in part the realization that other quantities can be derived with a similar dependence on Vπ for a particular frequency. In one embodiment of the present invention, a new parameter called $P_{null,in}$ is defined. The parameter $P_{null,in}$ is defined herein as the lowest input signal power at any frequency for which the link output power at that same frequency is at a local minimum. The dependence of the parameter $P_{null,in}$ on Vπ can be derived easily using the same method that was used to derive the expression for $IP3_{in}$ as a function of Vπ. The parameter $P_{null,in}$ can be expressed by the following equation:

$$P_{null,in}(f) \cong \frac{1}{2}\left(\frac{3.83}{\pi}\right)^2 \frac{V_\pi^2(f)}{R_0},$$

where 3.83 is approximately the smallest zero of Bessel function $J_1$, which is to say that $J_1(3.83) \cong 0$. It should be understood that numerous other expressions can be derived to directly calculate $V\pi$ from a single data point according to the present invention.

Figure 3:
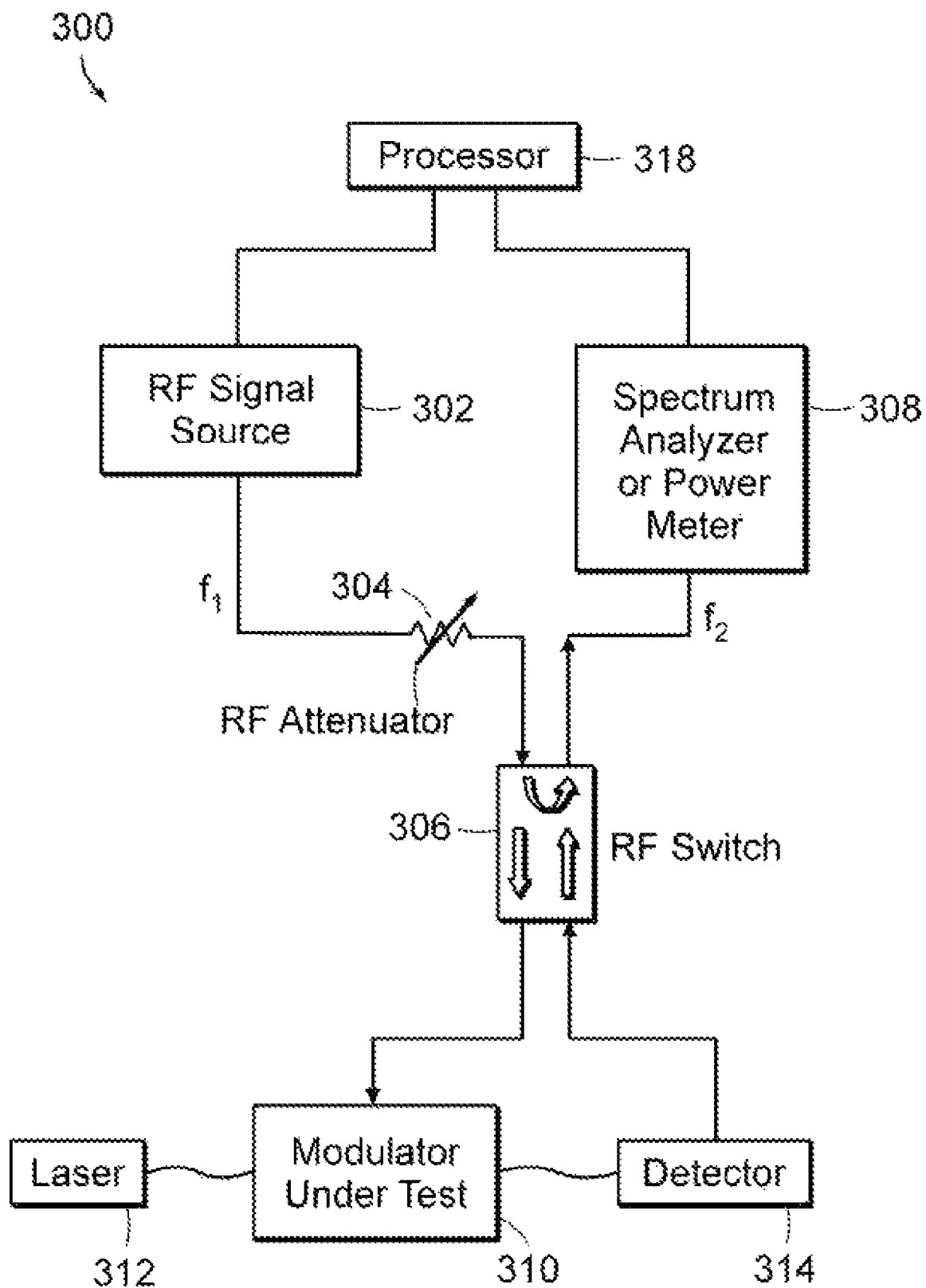
FIG. 3 illustrates a block diagram of an exemplary measurement apparatus for measuring $P_{null,in}$ (f) for calculating Vπ (f) of a Mach-Zehnder interferometric modulator according to the present invention.

FIG. 3 illustrates a block diagram of an exemplary measurement apparatus 300 for measuring $P_{null,in}$ to enable calculation of a Mach-Zehnder interferometric modulator's $V\pi$ according to the present invention. The measurement apparatus 300 includes only one RF signal source 302. The RF signal source 302 generates an RF signal at a frequency $f_1$. The output of the RF signal source 302 is coupled to an attenuator 304 that controls the level of the combined RF signal.

An RF switch 306 includes a first input that is coupled to the output of the RF attenuator 304. A first output of the RF switch 306 is coupled to an input of an RF spectrum analyzer or power meter 308. One feature of the measurement apparatus of the present invention is that a simple power meter can be used instead of a spectrum analyzer. A second output of the RF switch 306 is coupled to the RF modulation input of a modulator under test 310. The output of a laser 312 is optically coupled to an optical input of the modulator under test 310. The optical output of the modulator under test 310 is coupled to an input of a detector 314. The electrical output of the detector 314 is coupled the second input of the RF switch 310.

In some embodiments, a controller or processor 318 is used to control the RF source 302. The processor 318 can be a simple control circuit. However, in some embodiments, the processor 318 is a computer. An output of the processor 318 is electrically connected to a control input of the RF source 302. The processor 318 instructs the RF source 302 to vary or sweep the power of the RF modulation signal applied to the modulator under test 310 through a predetermined range.

In some embodiments, an output of the spectrum analyzer or power meter 308 is electrically connected to an input of the processor 318. The processor 318 may include an analog-to-digital converter that converts an analog output signal from the spectrum analyzer or power meter 308 to a digital signal. In various embodiments, the processor 318 displays or presents data for the RF detected signal power generated by the modulator under test 310 as a function of the RF input modulation signal power applied to the modulation input of the modulator under test 310. In some embodiments, the processor 318 calculates $V\pi$ from the data received from the spectrum analyzer or power meter 308.

In operation, a method for determining $V\pi$ (f) of an optical modulator according to the present invention includes generating a range of RF modulation signals. The optical modulator is modulated with a range of RF modulation signal powers. The resulting modulated optical signals are detected and RF detection signal are generated for the range of RF modulation signals.

A minimum RF detection signal power and the corresponding RF modulation signal power for the range of RF modulation signals is determined. The parameter $V\pi$ (f) is then calculated from the RF modulation signal power corresponding to the locally minimum RF detection signal power. For example, in one embodiment, the parameter $V\pi$ (f) is calculated directly from the parameter $P_{null,in}$ (f).

In some embodiments, the parameter $V\pi$ (f) is calculated from the RF modulation signal power corresponding to a first minimum RF detection signal power. In other embodiments, the parameter $V\pi$ (f) is calculated from the RF modulation signal power corresponding to at least one higher order minimum RF detection signal power, such as the second minimum RF detection signal power as the RF modulation signal power is increased from zero. Methods of the present invention may also include determining an expression for directly calculating $V\pi$ (f) from a minimum in the detected RF detection signal power.

There are many advantages and desirable features associated with using the measurement apparatus 300 to measure $P_{null,in}$ at a particular frequency and then using the $P_{null,in}$ (f) measurement to calculate $V\pi$ (f) for that particular frequency over the prior art method of extrapolating data to determine the $IP3_{in}$ (f) and then calculating $V\pi$ (f) from the extrapolation data. For example, one advantage of using the measurement apparatus of the present invention is that the test equipment is much simpler and much less expensive. Another advantage is that the measurement apparatus is easier to use so it can be operated by less skilled technicians. In particular, the measurement apparatus 300 uses a single RF signal source and can use a simple and inexpensive RF power meter to preform the measurements instead of a much more expensive RF spectrum analyzer that is used in prior art methods.

Also, another advantage of using the measurement apparatus of the present invention is that in many practical embodiments, the amplitude of the input RF signal in the desired range is relatively large. For example, the amplitude of the input RF signal can be on order of $V\pi$. The relatively large input RF signal results in a relatively large output RF signal at frequency $f_1$ (except very near $P_{null,in}$) that is easy to measure with inexpensive and commonly available test equipment. The relatively large output RF signal also makes it relatively easy to interpret the data.

Also, another advantage of using the measurement apparatus 300 is that there is no need to measure intermodulation distortion products because only a single RF source is used. Therefore, RF isolation devices and techniques are not needed.

Yet another advantage of using the measurement apparatus 300 is that the measurements are much simpler. For each input power, only one output power is measured. Furthermore, the measurement of one output signal power directly yields the relevant quantity $P_{null,in}$, which is in contrast to measuring parameter like $IP3_{in}$ that must be extrapolated from numerous measured data points. Using a direct measurement is preferred because direct measurements can eliminate ambiguity regarding where the relevant parameter occurs. Also, direct measurements are much less sensitive to variations in operating conditions, such as variations in modulator bias and/or optical power that can occur between acquisitions of sequentially measured data points.

Figure 4:
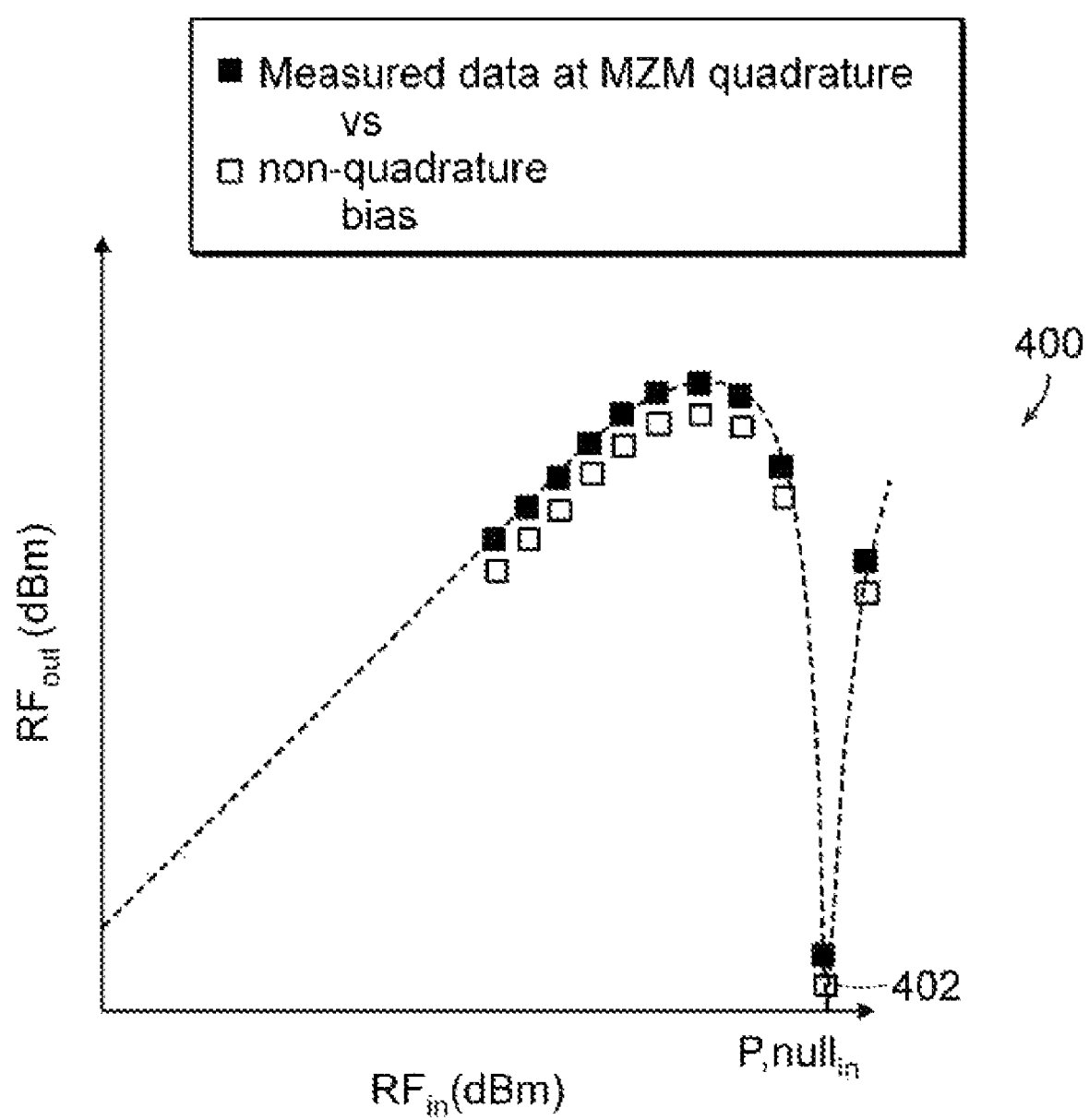
FIG. 4 presents experimental data for the measuring apparatus described in connection with FIG. 3 that determines $P_{null,in}$ (f) for calculating Vπ (f) of a Mach-Zehnder interferometric modulator.

FIG. 4 presents experimental data 400 for the measuring apparatus 300 described in connection with FIG. 3 that determines $P_{null,in}$ for calculating $V\pi$ (f) of a Mach-Zehnder interferometric modulator. These experimental data 400 were taken using a JDS Uniphase 1.55-μm DFB laser for the laser 312, an Arasor 1.55-μm lithium niobate Mach-Zehnder modulator for the modulator under test 310, and a Discovery Semiconductors InGaAs photodetector for the detector 314.

The experimental data 400 show the RF output signal power as a function of the RF modulation input signal power. The experimental data 400 were acquired with the modulator under test 310 operating at a quadrature bias condition and also with the modulator under test 310 operating at a non-quadrature bias condition. The resulting experimental data 400 for the modulator under test 310 operating at quadrature bias conditions and operating at non-quadrature bias conditions shows $P_{null,in}$ 402 at a first null. The data indicate that the user must carefully monitor the RF output signal to observe the first local minimum of the data. There can be an infinite number of higher order nulls that can be confused with the first null, $P_{null,in}$. However, the next-lowest "zero" of Bessel function $J_1$ is approximately 7.03. Therefore, the second local minimum is 5.28 dB (=20·log [7.03/3.83]) greater than $P_{null,in}$.

FIG. 5 presents a table 500 of data showing two measurements of $P_{null,in}$ and two calculations of $V\pi$ based on the two measurements of $P_{null,in}$ for a Mach-Zehnder interferometric modulator. The first measurement and calculation was performed for a 2 GHz RF signal. The second measurement and calculation was performed for a 6 GHz RF signal. The parameter $V\pi$ was calculated from the measured $P_{null,in}$ data. The resulting calculated values for the parameter $V\pi$ closely match the $V\pi$ parameters determined by using the prior art methods and apparatus described in connection with FIG. 1 which extrapolates data measurements of the $IP3_{in}$ point and then calculates $V\pi$.

EQUIVALENTS

While the present teachings are described in conjunction with various embodiments and examples, it is not intended that the present teachings be limited to such embodiments. On the contrary, the present teachings encompass various alternatives, modifications and equivalents, as will be appreciated by those of skill in the art, may be made therein without departing from the spirit and scope of the invention.

What is claimed is:

1. An apparatus for determining $V\pi$ of an optical modulator, the apparatus comprising:
   a. an RF source having an output that is electrically connected to an RF modulation input of the optical modulator, the RF source generating an RF modulation signal in a range of RF powers;
   b. an optical detector having an input that is optically coupled to an output of the optical modulator, the optical detector detecting a modulated optical signal generated by the optical modulator and generating an electrical detection signal at an output in response to the detected modulated optical signal;
   c. an RF power meter having at least one input that is coupled to the output of the RF source and that is coupled to the output of the optical detector, the RF power meter measuring an RF modulation signal power generated by the RF source and measuring an RF detection signal power generated by the optical detector; and
   d. a processor that calculates $V\pi$ of the optical modulator from a RF modulation signal power corresponding to a minimum RF detection signal power measured with the RF power meter.

2. The apparatus of claim 1 wherein a frequency of the RF modulation signal is adjustable so that $V\pi$ of the optical modulator can be determined as a function of frequency.

3. The apparatus of claim 1 wherein the minimum RF detection signal power comprises $P_{null,in}$.

4. The apparatus of claim 1 wherein the RF power meter comprises an RF spectrum analyzer.

5. The apparatus of claim 1 further comprising an RF coupler that couples a portion of the RF modulation signal generated by the RF source into the at least one input of the RF power meter.

6. The apparatus of claim 1 further comprising an RF switch that couples a portion of the RF modulation signal generated by the RF source and the RF detection signal into at least one input of the RF power meter.

7. The apparatus of claim 6 wherein the RF switch couples a second portion of the RF modulation signal generated by the RF source to the RF modulation input of the optical modulator.

8. The apparatus of claim 6 wherein the RF switch passes the electrical detection signal to at least one input of the RF power meter.

9. The apparatus of claim 1 wherein the processor includes an output that is electrically coupled to a control input of the RF source, the processor controlling at least one of a power of the RF modulation signal and a frequency of the RF modulation signal that is applied to the RF modulation input of the optical modulator.

10. A method for determining $V\pi$ of an optical modulator, the method comprising:
    a. generating a range of RF modulation signal powers;
    b. modulating an optical modulator with the range of RF modulation signal powers;
    c. detecting modulated optical signals and generating RF detection signals for the range of RF modulation signal powers; and
    d. determining a minimum RF detection signal power and the corresponding RF modulation signal power for the range of RF modulation signal powers; and
    e. calculating $V\pi$ from the RF modulation signal power corresponding to the minimum RF detection signal power.

11. The method of claim 10 wherein $V\pi$ is calculated from the RF modulation signal power corresponding to a first minimum RF detection signal power.

12. The method of claim 10 wherein the minimum RF detection signal power comprises $P_{null,in}$.

13. The method of claim 10 further comprising determining an expression for directly calculating $V\pi$ from the minimum RF detection signal power.

14. The method of claim 10 further comprising changing the frequency of the RF modulation signal powers to a new frequency and then repeating step a through step e to determine $V\pi$ for the new frequency.

15. An apparatus for determining $V\pi$ of an optical modulator, the apparatus comprising:
    a. means for generating a range of RF modulation signal powers;
    b. means for modulating an optical modulator with the range of RF modulation signal powers;
    c. means for generating RF detection signals for the range of RF modulation signal powers;
    d. means for determining a minimum RF detection signal power and a corresponding RF modulation signal power for the range of RF modulation signal powers; and
    e. means for calculating $V\pi$ from the minimum RF detection signal power.

16. The apparatus of claim 15 wherein $V\pi$ is calculated from the RF modulation signal power corresponding to a first minimum RF detection signal power.

17. The apparatus of claim 15 wherein the minimum RF detection signal power comprises $P_{null,in}$.

18. The apparatus of claim 15 wherein the means for calculating $V\pi$ comprises a processor.

19. The apparatus of claim 15 wherein the means for determining a minimum RF detection signal power and the corresponding RF modulation signal power comprises at least one of an RF power meter and an RF spectrum analyzer.

* * * * *